(12) United States Patent
Wintrich et al.

(10) Patent No.: US 7,624,082 B2
(45) Date of Patent: Nov. 24, 2009

(54) CORRELATION OF PLANT STATES FOR FEEDBACK CONTROL OF COMBUSTION

(75) Inventors: Franz Wintrich, Essen (DE); Volker Stephan, Hüpstedt (DE)

(73) Assignee: Powitec Intelligent Technologies GmbH, Essen (DE)

( * ) Notice: Subject to any disclaimer, the term of this patent is extended or adjusted under 35 U.S.C. 154(b) by 256 days.

(21) Appl. No.: 11/904,427

(22) Filed: Sep. 27, 2007

(65) Prior Publication Data

US 2008/0081302 A1    Apr. 3, 2008

(30) Foreign Application Priority Data

Sep. 30, 2006    (EP)    ................... 06020672

(51) Int. Cl.
*G06N 5/00*    (2006.01)
(52) U.S. Cl. ........................... 706/45; 704/232
(58) Field of Classification Search ............ 706/45; 435/6; 704/232
See application file for complete search history.

(56) References Cited

U.S. PATENT DOCUMENTS

| | | | |
|---|---|---|---|
| 5,687,286 A * | 11/1997 | Bar-Yam | ............ 704/232 |
| 6,059,194 A | 5/2000 | Wintrich et al. | |
| 6,145,453 A | 11/2000 | Martin et al. | |
| 6,355,423 B1 * | 3/2002 | Rothberg et al. | ............ 435/6 |
| 6,875,014 B2 | 4/2005 | Schmidt et al. | |
| 7,035,717 B2 | 4/2006 | Wintrich et al. | |
| 2005/0137995 A1 | 6/2005 | Wintrich et al. | |
| 2005/0147288 A1 | 7/2005 | Wintrich et al. | |
| 2007/0250216 A1 | 10/2007 | Wintrich | |

FOREIGN PATENT DOCUMENTS

| | | |
|---|---|---|
| CH | 663 999 A5 | 1/1988 |
| DE | 102 19 251 B3 | 1/2004 |
| EP | 0 955 499 B1 | 11/1999 |
| JP | 4-76307 | 11/1992 |

OTHER PUBLICATIONS

U.S. Appl. No. 11/837,950, filed Aug. 13, 2007; In re: Franz Wintrich et al., entitled Method for Developing a Process Model.

* cited by examiner

*Primary Examiner*—Wilbert L Starks, Jr.
(74) *Attorney, Agent, or Firm*—Womble Carlyle Sandridge & Rice, PLLC

(57) ABSTRACT

Material (G) is converted by a combustion process in a plant (1) while air (L) is supplied. The state of the system in the plant (1) is described by state variables (x, y) and is regulated at least by one control loop (3, 5, 7, 9). Groups of states (Z) are defined for at least one pair of correlated state variables (x, y), with the groups being comparable as regards changes (dx/dt, dy/dt) of the correlated state variables (x, y). Each group of comparable states (Z) is characterized, as regards their transition functions, by parameters (Kp, Tn, Tv) of a standard controller. In the event of changes in the state of the system in the plant (1), the closest groups of comparable states (Z) are selected, and their transition functions, characterized by the parameters (Kp, Tn, Tv), are used for the purposes of regulation the system.

20 Claims, 1 Drawing Sheet ary constant input variable x (dx/dt≈0), and a decrease in the input variable x (dx/dt<0).

CORRELATION OF PLANT STATES FOR FEEDBACK CONTROL OF COMBUSTION

CROSS-REFERENCE TO RELATED APPLICATION

The present application claims priority to EP 06 020 672.9, which was filed Sep. 30, 2006. The entire disclosure of EP 06 020 672.9 is incorporated herein by reference.

BACKGROUND

The present disclosure relates to a method and apparatus for regulating a combustion process in a plant, such as a power-generating plant, waste incineration plant, or a plant for making cement. A material is converted by the combustion process while air is being supplied. The state of a system in the plant can be described by state variables (x, y) and regulated at least by way of a control loop. In a known method of the type described above, regulation is carried out utilizing a simply structured control loop. The regulation could be optimized using further sensors, if the transition behavior of the control loop were better known.

SUMMARY

The present disclosure describes systems and methods for automatically regulating a combustion process in a plant, such as, in particular, a power-generating plant, waste incineration plant, or a plant for making cement. In one implementation, among others, a method for regulating a combustion process is described in which material is converted by the combustion process while air is being supplied. The state of the system in the plant can be described by state variables and can be regulated at least by way of a control loop. For at least one pair of correlated state variables, groups of states are defined that are comparable with regard to changes in the correlated state variables. Each group of comparable states is characterized, with regard to their transition functions, by parameters of a controller (e.g., a standard controller), the parameters of which are adapted to data of actual states. The method further includes that, when changes occur in the state of the system in the plant, the closest groups of comparable states are selected and their transition functions, which are associated with the parameters, are used for the purpose of regulation.

When the behavior of the actual control loop is matched to the behavior of a control loop having a standard controller for groups of comparable states, transition functions become available by way of which better predictions of future states and optimized regulation are made possible.

As an example, an exemplary embodiment of the present invention can be used in various stationary thermodynamic plants, in particular power-generating plants, waste incineration plants, and plants for making cement.

Other aspects and advantages of the present disclosure will become apparent from the following.

BRIEF DESCRIPTION OF THE DRAWINGS

The invention is explained in greater detail below with reference to an exemplary embodiment illustrated in the drawings that are described briefly in the following.

DETAILED DESCRIPTION

Figure 1:
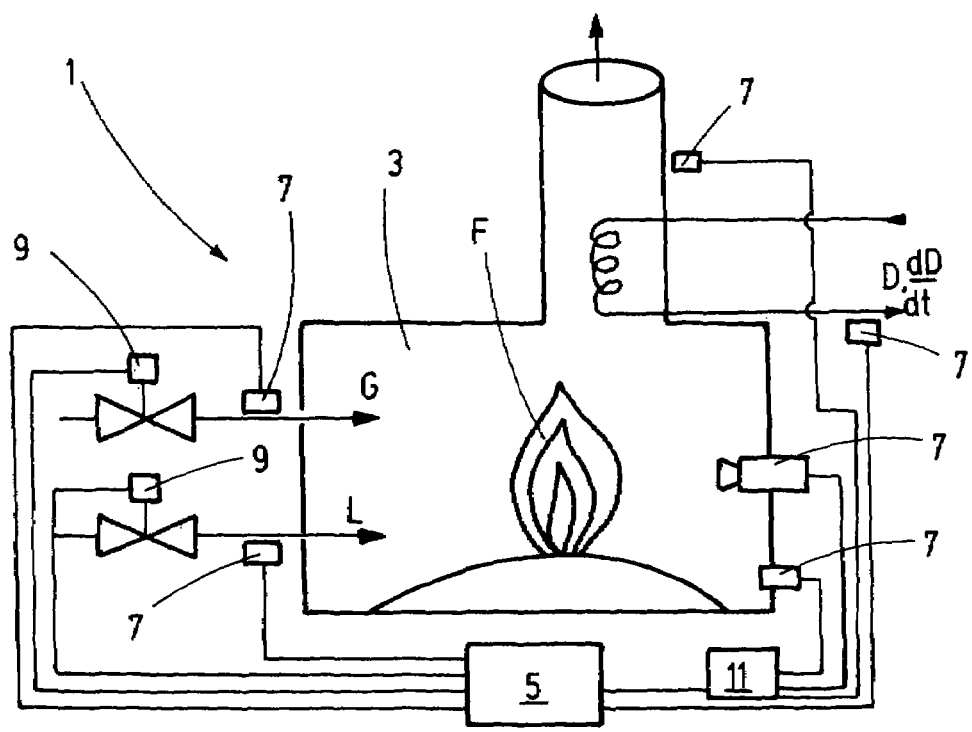
FIG. 1 is a schematic view of plant.
Figure 2:
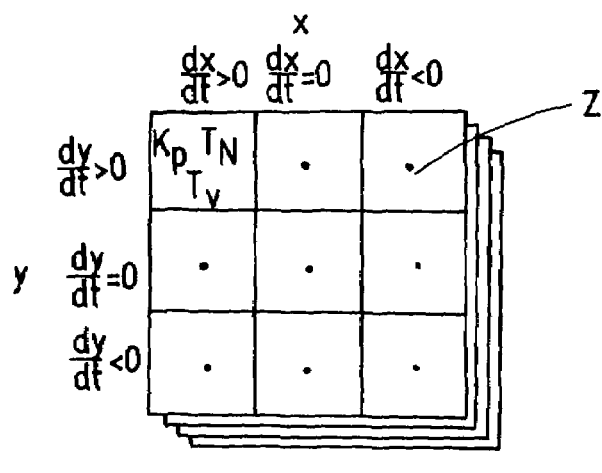
FIG. 2 is a schematic view of the tables of the pairs of correlated state variables with the associated groups of comparable states.
Figure 3:
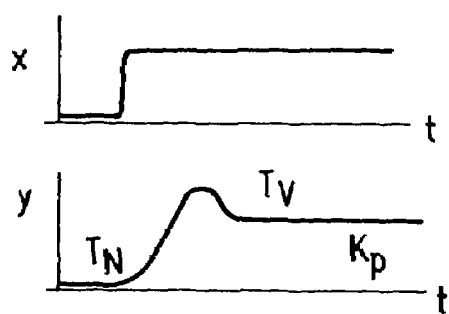
FIG. 3 is a schematic view of a transition and of the step response in the case of a pair of correlated state variables.

Referring now in greater detail to the drawings, a plant 1 (e.g., a coal-fired, oil-fired, or gas-fired power-generating plant, waste incineration plant, or cement-making plant, with integrated steam generation) comprises a furnace 3 (e.g., which may be in the form of a grate), a conventional controller 5, at least one sensor 7, at least one adjusting device 9, and a computer 11.

The furnace 3 is supplied with fuel or other material to be converted. The fuel or other material to be converted is generally designated by the reference character "G" and may be, for example, coal, oil, gas, waste materials, lime or the like. The furnace 3 is also supplied with primary air (or primary oxygen) and secondary air (or secondary oxygen), designated by the reference character "L". The supply of material G and oxygen L (e.g., air containing oxygen) is controlled by the adjusting devices 9. The actuation of an adjusting device 9 is referred to as an action. In the furnace 3, a combustion process takes place, the principal or secondary purpose of which is to generate steam. Over the period of time t, the sensors 7 record various data in the plant 1, such as, for example, the supply of material G, the supply of oxygen (e.g., air containing oxygen) L, images of the flame F (e.g., images of the body of the flame) in the furnace 3, the amount of steam D generated or the steam output dD/dt, concentrations of gas and pollutants in the waste gas or temperatures.

A control loop is defined by at least the furnace 3 as the (controlled) system, the sensor 7 for recording the amount of steam D or the steam output dD/dt, the controller 5 and the adjusting devices 9. Further sensors 7 may be connected to the computer 11. For control purposes, the computer 11 is connected (e.g., directly connected) at least to the controller 5 and possibly also to the adjusting devices 9. The sensors 7 record—as well as possible—the state of the system, which is defined by various state variables. Some of the state variables, namely the adjustable variables or input variables x, are assigned to the individual adjusting devices 9 and to their control capabilities. Other capturable state variables, such as the steam volume D or the steam output dD/dt, are output variables y, in which the deviation of the actual value from the set-point values is determined. Still other state variables, such as the calorific value of the material G, are disturbance variables that normally cannot be directly captured.

The computer 11 is intended to optimize the regulation undertaken by the controller 5. In accordance with the exemplary embodiment of the present invention, for this purpose the behavior of the control loop is examined in order to capture and learn the transition functions in the system of the plant 1.

It was found that (at least in theory) certain pairs of state variables are correlated, i.e. their behavior is more closely related than other possible combinations. For each pair of correlated state variables, such as, for example, the amount of air L supplied as an input variable x and the steam output dD/dt as an output variable y, a table is prepared that places changes dx/dt in the input variable x in relation to changes dy/dt in the output variable y. However, two output variables may also be correlated with each other, such as, for example, the oxygen content and the sulfur dioxide content in the waste gas, so that they are given their own table.

Each table contains, for example, three rows and three columns, i.e., nine cells. The three columns represent an increase in the input variable x (dx/dt>0), an at least approximately constant input variable x (dx/dt=0), and a decrease in the input variable x (dx/dt<0). The three rows represent an increase in the output variable y (dy/dt>0), an at least approximately constant output variable y (dy/dt=0), and a decrease in the output variable y (dy/dt<0). The individual cells thus each represent a certain group of—possibly transient—states Z that are comparable as regards the changes in the two correlated state variables x and y.

In order to fill the cells of the table with contents, it is assumed that the system is regulated by a hypothetical standard controller, such as a proportional-integral-derivative (PID) controller. The PID controller can be characterized in known fashion by three parameters, namely the proportional gain factor $K_p$, the reset time $T_N$, and the derivative time $T_V$. These three parameters are entered into each cell. The step response, i.e., the response of the PID controller to a step at its input, shows, for example, an overshoot as a transient state with the new state subsequently being approached. The center cell indicates the state at the set-point value.

The parameters contained in the tables prepared in this way are adapted in the computer 11 to data of actual states that are initially obtained, for example, by specifically polling certain states, and are then later preferably removed from the current operation. In this way, the parameters for each cell are determined by statistical methods from the data of the associated states. Customary learning methods may be used. In order to better prepare them for the computer 11, the parameters of all the cells in all the tables can be lined up one behind the other. This one-dimensional field can be referred to as a genome.

With the filled-out tables, the computer 11 can make better predictions of future states and thus optimize regulation by the controller 5. If the state of the system changes, for example due to a rise in an output variable y while the input variable x remains constant, the computer 11 searches for that particular cell with that particular group of comparable states Z, which, by reason of their arrangement in the tables, comes closest to the current state, i.e. in the example chosen dx/dt=0 and dy/dt>0. By way of $K_p$, $T_N$ and $T_V$ stored therein, the computer 11 can estimate the further temporal development of the state. By including information supplied by other sensors 7, in particular the image of the flame body F together with the associated image processing, the computer 11, in which preferably a neuronal network is implemented, can predict future states, determine the appropriate action, and actuate the controller 5, in particular by modifying the set-point values, or it may directly actuate the adjusting devices 9, so that in a timely fashion it can counteract the transition to undesired states. With this kind of regulation, various targets can be attained. For example, deviations of the actual value of the steam output dD/dt from the set-point value can be kept to a minimum or concentrations of pollutants in the waste gas can be minimized.

The possibility of counteracting in good time a transition to undesired states, i.e. to limit the effects of disturbance variables, permits the plant 1 to be operated very close to the maximum permissible steam output dD/dt. The calorific value of the material G is a particularly interesting disturbance variable. If the calorific value drops while the mass flow of the material G remains constant, the steam output dD/dt drops, so that the mass flow needs to be increased. The same applies analogously if the calorific value rises. With the help of the table and the transition functions contained therein, the current state can be better recognized and a change in the calorific value and its effects can be better estimated, so that re-adjustments can be carried out in good time without any substantial changes occurring in the steam output dD/dt.

In accordance with the exemplary embodiment of the present invention and as should be apparent to one of ordinary skill in view of the foregoing, the computer 11 (which includes appropriate input and output devices, a processor, memory, etc.) may control the operation of the plant 1 by virtue of receiving data from and/or providing data (e.g., instructions from the execution of software stored in memory) to respective components. For this purpose and in accordance with the exemplary embodiment of the present invention, the computer 11 typically includes or is otherwise associated with one or more computer-readable mediums (e.g., volatile memory and/or nonvolatile memory and/or one or more other storage devices such as, but not limited to, tapes and hard disks such as floppy disks and compact disks) having computer-executable instructions (e.g., one or more software modules or the like), with the computer handling (e.g., processing) the data in the manner indicated by the computer-executable instructions. Accordingly, the computer 11 can be characterized as being schematically illustrative of the computer-readable mediums, computer-executable instructions and other features of methods and systems of the exemplary embodiment of the present invention.

It will be understood by those skilled in the art that while the present invention has been discussed above with reference to an exemplary embodiment, various additions, modifications and changes can be made thereto without departing from the spirit and scope of the invention as set forth in the following claims.

We claim:

1. A method for regulating a combustion process in a plant, wherein material is converted by way of the combustion process while at least oxygen is supplied to the combustion process, and a state of a system in the plant is at least partially described with state variables, the method comprising:
   regulating the system at least by way of a control loop, with the regulating of the system including
   (a) identifying at least one pair of the state variables that are correlated with respect to one another;
   (b) defining groups of comparable states for at least one pair of the state variables that are correlated with respect to one another, so that for each of at least some of the groups of comparable states
      (1) the group of comparable states are comparable with respect to changes in the correlated state variables that correspond to the group of comparable states, and
      (2) transition functions of the group of comparable states are characterized by parameters of a controller, wherein the parameters are adapted to data of actual states;
   (c) selecting, in response to change from an initial state to a subsequent state of the system, one or more of the groups of comparable states that are closest to the subsequent state; and
   (d) using the transition functions of the selected one or more of the groups of comparable states in the regulating of the combustion process.

2. The method according to claim 1, wherein for each of at least some of the groups of comparable states and the correlated state variables that correspond to the group of comparable states:
   the group of comparable states comprises possible combinations of the correlated state variables that are increasing, remaining substantially constant, and decreasing; and
   the possible combinations of the correlated state variables are arranged in a table.

3. The method according to claim 2, wherein the number of possible combinations is nine.

4. The method according to claim 2, wherein for each group of comparable states, the transition functions of the group of comparable states are characterized by parameters of a proportional-integral-derivative controller.

5. The method according to claim 2, wherein the parameters are statistically adapted to data of actual states.

6. The method according to claim 1, wherein for each of at least some of the groups of comparable states, the transition functions of the group of comparable states are characterized by parameters of a proportional-integral-derivative controller.

7. The method according to claim 1, wherein the parameters are statistically adapted to data of actual states.

8. The method according to claim 1, wherein the plant is a power-generating plant, a waste incineration plant, a plant for making cement, or any combination thereof.

9. A computer-readable medium having computer-executable instructions for performing the method of claim 1.

10. A plant apparatus comprising:
a control loop that includes
(a) a furnace for converting material by way of a combustion process which is supplied with at least oxygen,
(b) at least one adjusting device for adjusting how the combustion process is being supplied,
(c) a controller for regulating the combustion process by controlling at least the adjusting device, and
(d) at least one sensor for measuring one or more state variables, wherein
(1) a state of a system in the plant is at least partially described with the state variables,
(2) at least one pair of the state variables are correlated with respect to one another, and
(3) there are groups of comparable states for at least one pair of the state variables that are correlated with respect to one another, and for each of at least some of the groups of comparable states
(i) the group of comparable states are comparable with respect to changes in the correlated state variables that correspond to the group of comparable states, and
(ii) transition functions of the group of comparable states are characterized by parameters of a controller, and the parameters are adapted to data of actual states; and
a computer for optimizing the regulating of the combustion process that is carried out by the controller, wherein the computer is configured for at least (a) selecting, in response to change from an initial state to a subsequent state of the system, one or more of the groups of comparable states that are closest to the subsequent state, and
(b) using the transition functions of the selected one or more of the groups of comparable states in the regulating of the combustion process.

11. The plant according to claim 10, wherein the computer is adapted to:
predict future states, and
actuate the controller, the adjusting device or any combination thereof in the regulating of the combustion process.

12. The plant according to claim 11, wherein:
a neuronal network is implemented in the computer;
the computer predicts, by way of the neuronal network, the future states;
the computer determines, by way of the neuronal network, appropriate actions to take further to regulating the combustion process; and
the computer actuates, by way of the neuronal network, the controller, the adjusting device or any combination thereof in the regulating of the combustion process.

13. The plant according to claim 12, wherein the computer predicts the future states using both the transition functions and additional information.

14. The plant according to claim 13, wherein the additional information comprises information obtained from processing at least an image of a flame formed when the material is converted by way of the combustion process.

15. The plant according to claim 13, wherein the computer is adapted to actuate the controller by modifying the set-point values of at least some of the state variables.

16. The plant according to claim 12, wherein the computer is adapted to actuate the controller by modifying the set-point values of at least some of the state variables.

17. The plant according to claim 11, wherein the computer is adapted to actuate the controller by modifying the set-point values of at least some of the state variables.

18. The plant according to claim 10, wherein the computer is adapted to actuate the controller by modifying the set-point values of at least some of the state variables.

19. The plant according to claim 10, wherein the plant is power-generating plant, a waste incineration plant, a plant for making cement, or any combination thereof.

20. The plant according to claim 10, wherein the computer is adapted to at least partially define the groups of comparable states.

* * * * *